(12) United States Patent
Golec

(10) Patent No.: US 11,118,058 B2
(45) Date of Patent: Sep. 14, 2021

(54) COMPOSITION, METHOD AND USE

(71) Applicant: Marcin Golec, London (GB)

(72) Inventor: Marcin Golec, London (GB)

( * ) Notice: Subject to any disclaimer, the term of this patent is extended or adjusted under 35 U.S.C. 154(b) by 164 days.

(21) Appl. No.: 16/664,914

(22) Filed: Oct. 27, 2019

(65) Prior Publication Data

US 2020/0231812 A1 Jul. 23, 2020

(30) Foreign Application Priority Data

Jan. 21, 2019 (EP) .................................. 19152743
Oct. 14, 2019 (EP) .................................. 19203045

(51) Int. Cl.

| | | |
|---|---|---|
| *C08L 91/06* | (2006.01) | |
| *C08K 3/04* | (2006.01) | |
| *B62M 9/00* | (2006.01) | |
| *C08K 5/01* | (2006.01) | |
| *C08L 33/08* | (2006.01) | |
| *C08K 5/05* | (2006.01) | |
| *C08L 23/28* | (2006.01) | |
| *B62J 13/00* | (2006.01) | |
| *C08L 91/08* | (2006.01) | |

(52) U.S. Cl.
CPC ............... *C08L 91/06* (2013.01); *B62J 13/00* (2013.01); *B62M 9/00* (2013.01); *C08K 3/042* (2017.05); *C08K 5/01* (2013.01); *C08K 5/05* (2013.01); *C08L 23/28* (2013.01); *C08L 33/08* (2013.01); *C08L 91/08* (2013.01); *B62M 2009/005* (2013.01); *C08L 2201/52* (2013.01)

(58) Field of Classification Search
CPC .......... C08L 91/06; C08L 33/08; C08L 23/28; C08L 91/08; C08L 2201/52; C08K 3/042; C08K 5/01; C08K 5/05; B62M 9/00; B62M 2009/005; B62J 13/00
See application file for complete search history.

(56) References Cited

U.S. PATENT DOCUMENTS

2010/0276229 A1   11/2010   Winckler

FOREIGN PATENT DOCUMENTS

| CN | 102618373 A | 8/2012 |
|---|---|---|
| CN | 107418683 A | 12/2017 |
| WO | 2014189065 A1 | 11/2014 |

OTHER PUBLICATIONS

Hongmei Xie, Bin Jiang, Jiahong Dai, Cheng Peng, Chunxia Li, Quan Li, and Fusheng Pan, Tribological Behaviors of Graphene and Graphene Oxide as Water-Based Lubricant Additives for Magnesium Alloy/Steel Contacts, Article, Jan. 29, 2018, 18 pages.

*Primary Examiner* — Angela C Scott
(74) *Attorney, Agent, or Firm* — Mark M. Friedman

(57) ABSTRACT

The present invention is directed to aqueous compositions with wax and graphene. These compositions offer surprising benefits in reducing bicycle or motorbike chain lengthening, particularly in off road environments with high dirt and water levels such as during mountain biking or off-road biking. The invention is further directed to a method of preparing such compositions and to the use of such compositions on bicycle or motorbike chains.

20 Claims, No Drawings

COMPOSITION, METHOD AND USE

TECHNICAL FIELD

The present invention is directed to a method of protecting a bicycle or motorbike chain from dirt by dripping a composition on the chain, to a method of cycling using a mountain bike with a bicycle chain by first treating the bicycle chain with a dirt protecting composition and subsequently cycling in an off-road environment, and to a method of preparing a composition and to a composition for use in protecting bicycle chains from dirt.

Further, the invention is directed to a method of riding a bicycle or motorbike with a chain by first treating the chain with a protecting composition and subsequently riding in an off-road environment.

The invention is also directed to a chain covered or treated with a composition according to the invention.

BACKGROUND TO THE INVENTION

Bicycle or motorbike chains are treated with lubricants, such as liquid oil-based or aqueous-based lubricants to smoothen metal to metal contact. Such "lubes" are dripped on the bicycle or motorbike chain. Oil-based lubricants with different viscosities are available on the market, some having additives like Teflon powder. These oils however do not dry and collect a lot of dirt during bicycle rides, particularly off road, creating in effect an abrasive paste that resides inside a chain. Dirt collection compromises the durability of the bicycle or motorbike chain over time, leading to chain lengthening. CN102618373 discloses an oil-free bicycle chain lubricant. Commercially available aqueous-based lubricants include wax compositions that dry somewhat over time leaving a wax layer on the chain. However, the layer does not fully dry and remains somewhat sticky, thus also collecting dirt.

Another lubrication option is to apply so-called "dry lube" which consists of a solvent such as ethanol and an additive such as Teflon or a ceramic powder. After evaporation of the solvent, the additive is left in dry form on the chain. Wind and chain movement however quickly remove the additive, rendering this option generally ineffective in lubricating bicycle chains.

Bicycle or motorbike chains can also be submersed in a bath of hot, molten, liquid paraffin wax. Such bathes are at around 150° C. and give off unpleasant, unhealthy fumes. After removal of the chain from the bath, a thin layer of solid wax is left on the chain for lubrication. Depending on the environmental conditions, regular reapplication of the wax is required, probably every few hundred kilometers under normal conditions but under off road conditions even more frequently. This method is inconvenient because the bicycle or motorbike chain needs to be removed from the bike each time for the molten wax bath treatment and this has to be done more frequently than other lube options mentioned before. Consequently, use of molten wax is a cumbersome option, even impractical for longer rides or for very muddy environments.

There remains a need for keeping bicycle or motorbike chains in optimal condition, particularly when the bicycle or motorbike chains are exposed to dirt in challenging off-road environmental conditions with high dirt levels such as those used in mountain biking.

SUMMARY OF THE INVENTION

The present invention is directed at extending the life of bicycle and motorbike chains. While lubricants of the prior art smoothen (i.e. lubricate) metal to metal contact, we realized they still lead to undesirable, fast bicycle or motorbike chain lengthening over time particularly in off road conditions due to abrading metal of chain pin and inner plate extrusions. Such bicycle or motorbike chain lengthening is undesirable as it compromises the interaction between the bicycle or motorbike chain and the sprockets, leading to increased friction between chain and chainrings and sprockets that lowers power transfer from the pedals to the wheels. Fast increasing pitch of the chain, due to wear, exponentially increases wear on all the components that have a contact with a chain, namely chainrings, cassettes and for example derailleur sprockets.

Accordingly, it is the objective of the present invention to extend the life of bicycle or motorbike chains by limiting bicycle or motorbike chain lengthening in off-road environments with high dirt levels, such as those used in mountain biking.

The present invention is directed a method of protecting a bicycle or motorbike chain from dirt by dripping a composition comprising from 30 to 90% by weight of water; from 5 to 65% by weight of wax selected from microcrystalline wax, paraffin and mixtures thereof; and from 0.005 to 10% by weight of graphene on the chain. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Further, the invention is directed to a method of cycling or riding using a mountain or motorbike with a bicycle or motorbike chain by first treating the bicycle or motorbike chain with a dirt protecting composition comprising from 30 to 90% by weight of water; from 5 to 65% by weight of wax selected from microcrystalline wax, paraffin and mixtures thereof; and from 0.005 to 10% by weight of graphene and subsequently cycling or riding in an off-road environment. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Further, the invention is directed to a method of preparing a composition comprising from 30 to 90% by weight of water; from 5 to 65% by weight of wax selected from microcrystalline wax, paraffin and mixtures thereof; and from 0.005 to 10% by weight of graphene, by preparing an aqueous composition with water and wax and subsequently stirring in the graphene. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Furthermore, the invention is directed to a composition for use in protecting bicycle or motorbike chains from dirt comprising from 30 to 90% by weight of water; from 5 to 65% by weight of wax selected from microcrystalline wax, paraffin and mixtures thereof; and from 0.005 to 10% by weight of graphene. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Preferably, the composition further comprises from 0.1 to 10% by weight of an inhibitor or a plurality of inhibitors (i.e. one or more inhibitors).

The invention is directed to a bicycle or motorbike chain covered by a composition comprising from 30 to 90% by weight of water; from 5 to 65% by weight of wax selected from microcrystalline wax, paraffin and mixtures thereof; and from 0.005 to 10% by weight of graphene. Preferably, the composition comprises from 50 to 80% by weight of water and preferably from 10 to 50% by weight of wax. By definition the amount of the above three components is 100% by weight or less of the composition, as other optional ingredients can be added to the composition.

Surprisingly, we have found that the compositions of the present invention provide protection against dirt and reduce bicycle and motorbike chain lengthening in bicycle or motorbike applications. While the prior art teaches lubrication to smoothen metal-metal contact, the present invention is directed at protecting the bicycle or motorbike chain against the effects of dirt that deposits in and on the bicycle or motorbike chain, negatively affecting the chain durability and leading to undesirable chain lengthening. Surprisingly, we have found that use of the dirt protecting composition of the invention leads to better and longer bicycle and motorbike chain life under such circumstances. Furthermore, the present invention synergistically combines the effect of lubrication by means of the wax present on the chain and the dirt protection effect by means of the graphene entrapped in the wax.

Without wishing to be bound by any theory, it is believed that water used as a medium allows the graphene to penetrate into the chain while the wax subsequently keeps the graphene on the chain.

Chain lengthening can easily be determined using a standard device a so-called "chain checker tool". Of course, a regular rule or caliper may also be used. Chain lengthening can be expressed in percentages where 0% represents a new chain while 100% chain lengthening represents such lengthening that the standard chain checker tool sinks into the chain links on both sides; this means that the chain has lengthened to such an extent that replacement should be considered; in cycling, this is generally considered to be the standard of 0.5 mm over 10 links.

DETAILED DESCRIPTION OF THE INVENTION

Compositions of the invention preferably comprise graphene material. Graphene consists of 1 nm thick sheets of hexagonally organized carbon structures. The physical structure and physical properties are different from graphite with which it should not be confused. Graphene is very strong, water repellant, electric-conductive, air tight material and was only discovered in 2004 in the UK. "Graphene: a new emerging lubricant" by Diana Berman et al., Materials today, vol 17, number 1, January/February 2014 discusses the lubricating qualities of graphene in solid state and in oil-based compositions. U.S. Pat. No. 8,222,190 discloses the general use of graphene for lubrication and exemplifies oily based compositions.

For the purpose of the invention, graphene oxide is considered to be covered by graphene. Graphene can be produced from graphite by various methods known in the art.

We found that application of graphene in dry powder form to the chain does not lead to good chain protection results due to the fact that powder is quickly removed by air flow and moving chain. Also, application of graphene in oily compositions leads to accumulation of dirt on and in the bicycle or motorbike chain, due to the oily composition attracting and collecting dirt. However, we have surprisingly found that compositions comprising graphene in combination with wax, applied in an aqueous composition to the bicycle chain, leads to surprisingly limited chain lengthening even under challenging environmental conditions with high dirt levels such as mountain biking.

According to the invention, graphene is preferably added to the composition in particulate form, for instance measured with STEM (Scanning Transmission Electron Microscopy) with a lateral size in the range of 400 nm+/−150 nm and a flake thickness of 3 nm+/−2 nm but smaller or larger particles may also be used.

Preferably, the graphene has 9+/−6 layers. In one embodiment, the invention is directed to crumpled graphene. Beneficially, we have found that crumpled graphene does not agglomerate and does not stick together. While graphene (including graphene oxide) can be used in the invention, crumpled graphene (or crumpled graphene oxide) can be sufficiently mixed into the aqueous wax compositions according to the invention without the use of a dispersant or surfactant.

Preferably, the composition of the invention comprises graphene at level of from at least 0.005% by weight, more preferably from at least 0.01% by weight and preferably up to at most 10% by weight, more preferably up to at most 5% by weight, most preferably at most 3% by weight, especially preferred at most 1% by weight and in particularly preferred at most 0.5% by weight.

According to the invention, graphene is preferably combined with wax in an aqueous carrier composition. Wax may be present in the composition in particulate form or dissolved, but the composition is preferably an aqueous wax emulsion or solution. Such aqueous wax emulsions and solutions are well-known in the art and have been available for a long time. After application on bicycle or motorbike chains, the water evaporates from the compositions, leaving a thin layer of wax and graphene on bicycle or motorbike chains, which acts surprisingly well against the detrimental effects of dirt on bicycle or motorbike chains.

Compositions of the invention comprise wax. The wax of the invention is preferably solid at room temperature. The wax is preferably selected from hard waxes with a melting point of preferably higher than 45° C., more preferably higher than 55° C., most preferably higher than 60° C. and preferably up to 110° C., more preferably up to 100° C. Melting points can be measured using needle penetration, for instance as measured according to the American standard ASTM DS, of 3 to 40 at 25° C.

Preferably, wax is selected from animal waxes, vegetable waxes, mineral waxes, synthetic waxes, and mixtures thereof. Animal waxes are preferably beeswax, spermaceti, lanolin, and shellac wax. Preferred vegetable waxes are carnauba, candellila, bayberry, and sugarcane wax. Preferred mineral waxes are ozokerite, ceresin, montan, paraffin, microcrystalline wax, petroleum and petrolatum wax. Preferred synthetic waxes are silicone waxes, polyol etheresters, hydrogenated plant oils such as castor oil, jojoba wax, sunflower oil, cotton oil, copra oil and lanolin oils; ethylenic polymers, and hydrocarbon type wax, such as Fischer Tropsch waxes. According to the invention, paraffin can be high grade paraffin which only has up to 1% of oil (by weight of paraffin) or it can be lower grade paraffin containing more oil for instance up to 20% or 10% by weight of paraffin.

Preferred waxes of the invention are petroleum derived wax, including petrolatum (petroleum jelly), microcrystalline wax and paraffin. More preferred are microcrystalline wax and paraffin. Particularly preferred is paraffin. Paraffin is solid at room temperature and is provided in block or chunks.

Preferably, the composition comprises wax at a level of from at least 5% by weight, more preferably at least 10% by weight, most preferably from at least 20% by weight, in particularly preferred from at least 30%, and preferably up to at most 65% by weight, more preferably at most 60% by weight, most preferably up to at most 50% by weight and particularly preferred is up to at most 45% by weight.

Preferably, the composition comprises a liquid phase. The liquid phase preferably comprises water at a level of at least 80% by weight, more preferably at least 90% by weight or more and preferably up to 100% by weight. Preferably the composition of the invention comprises water at a level of at least 30% by weight, more preferably at least 35% by weight of the composition, most preferably from at least 50% by weight, in particularly preferred from at least 55% by weight, most preferably at least 60% by weight and preferably up to at most 90% by weight, and more preferably from at most 80% by weight.

According to a preferred embodiment of the present invention, an inhibitor is added to assist in preparing the wax composition. The term inhibitor is well-known in this industry. Inhibitors are used in commercially available products, such as Squirt® and Smoove®. For the purpose of the invention, an inhibitor—sometimes called "crystallization inhibitor" or "wax inhibitor"—is defined as a compound that affects—inhibits—crystallization of the wax. According to the invention, the inhibitor physically affects crystallization of the wax and assists in preparing an emulsion. Inhibitors exist with a wide variety of chemical structure. Examples are the Basoflux® product series, such as PI and RD types that also find application in compositions of the present invention. Other brand names are Shellsol, Flowsolve 120 (acrylic polymer). Polyacrylates can be used (see examples mentioned in "Evaluation of effects of selected wax inhibitors on wax appearance and disappearance temperatures", Wang et al, Petrol Sci Technol, 2003, 359-368). Solvents and oils, such a mineral oil and organic oil, can be used. Specific examples are hexane or pentane or xylene or Solvesso 100® (2E,4E-hexa-2,4-dienal). Further examples are emulsifiers such as polyethylene glycol sorbitan monostearate (for example Tween 40® and Tween 60®), hexadecanol, polyethylene glycol hexadecyl ether (for example Brij 52®), cocoamidopropyl betaine (abbreviated as CAPB) and diethanolalkylamines (for example wherein alkyl is $CH_3$—$(CH_2)_n$— with n from 13 to 21).

Depending on the type, the composition of the invention preferably comprises at least an (i.e. one or more) inhibitor as indicated above at a level of from 0.1% by weight of the composition, more preferably from 0.5% by weight, most preferably from 1% by weight and preferably up to 10% by weight, more preferably up to 7% by weight, and most preferably up to 5% by weight.

We have found that dirt particles accumulate more in the liquid oily compositions. This may render oily substances (liquid at room temperature) less attractive for incorporation at higher levels in certain compositions of the invention. Accordingly, certain compositions of the invention preferably comprise liquid oily substances at levels less than 10% by weight of the composition, more preferably less than 5% by weight, most preferably less than 3% by weight, while most preferably, these compositions are free of such liquid oils.

The composition of the invention may optionally comprise further ingredients. For instance, solvents or specifically organic solvents (such as ethanol, propanol, isopropylalcohol) may be at levels up to 10% by weight. Preferably biocide solvents are included in the composition of the invention. Preferred biocide solvents are 5-Chlor-2-methyl-2H-isothiazol-3-on, 2-Methyl-2H-isothiazol-3-on, and/or mixtures thereof, for instance at levels up to 10% by weight. Dispersants or surfactants can be included, though that is not needed for crumpled graphene.

A preferred composition according to the present invention comprises 30-90% by weight of water, 5-65% by weight of paraffin (preferably emulsified in an aqueous base), 0.01-5% by weight of graphene, and 1-5% by weight of inhibitor. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

The invention is further directed to a method of preparing compositions by first mixing the wax with water (preferably with an inhibitor and/or solvents) and subsequently adding graphene, preferably under stirring. Preferably, the wax is incorporated in the composition such that an aqueous wax emulsion or solution results. Preferably, the wax is emulsified or dissolved in the aqueous composition using an inhibitor. Preferably, the graphene is added in powder form under stirring.

The invention further relates to a method of protecting bicycle or motorbike chains from dirt by dripping the composition of the invention on bicycle or motorbike chains. Subsequently, the water is left to evaporate, preferably while moving the bicycle chain over the sprocket and chain ring to distribute the composition of the invention in and on bicycle or motorbike chains. After water evaporation, the resulting composition is pasty (i.e. has a shoe polish with a paste-like consistency) which is beneficial for retaining the wax and graphene in place on bicycle or motorbike chains, yet does not excessively collect dirt.

As well-known in this technical field, bicycle and motorbike chains generally comprise links. Each of those links consists of several parts that are typically combined as follows: each of the two ends of a first outer plate 1 is connected through a first inner plate and a second inner plate to a second outer plate with a pin. The pins are surrounded by roller 5 and, often, a bushing is present between the roller and the pin. Similar chain designs exist without bushings, these are sometimes called "bushing-less". While usable in bushing-less bicycle chains, the present invention is particularly useful in reducing chain lengthening in bicycle or motorbike chains with bushings. Teeth of the chain ring and the sprocket engage with subsequent rollers of the links of the bicycle or motorbike chain, moving the bicycle or motorbike forward.

The invention is further directed to a method of cycling using a mountain bike with a bicycle chain wherein first the bicycle chain is treated with the dirt protecting composition according to the invention and, subsequently, the bicycle is used in an off-road environment. Compositions of the invention are particularly useful for mountain bikes (sometimes called all terrain bike). These bicycles often have suspension at least for the front wheel and preferably also for the rear wheel. Importantly, the tires of mountain bike have knobs, made of rubber, and extending radially outwards, generally for around 1 to 5 mm. These knobs improve the tire's grip on the underlying soil, offering stability in off-road environments. However, the knobs on the moving tires also increase the amount of dirt kicked up onto the bicycle chain, thus aggravating the problem of chain lengthening. Accordingly, the composition of the invention is particularly useful for mountain bikes that are used in off-road environments. And in the same way, the invention is directed to a method of riding using a mountain bike or motorbike with a bicycle or motorbike chain by first treating the bicycle or motorbike chain with a dirt protecting composition comprising from 30% (preferably from 35%, more preferably from 50%) to 90% (preferably to 80%) by weight of water; from 5% (preferably from 10%) to 65% (preferably to 60% more preferably to 50%) by weight of wax selected from microcrystalline wax, paraffin and mixtures thereof; and from 0.005 to 10% by weight of graphene and subsequently riding in an off-road environment. The composition according to the invention can be used on any chain with chain links and is preferably used on bicycle and motorbike chains.

EXAMPLES

Example 1—Preparation

The composition according to the invention was prepared by stiffing graphene (3% by weight; graphene) into an aqueous wax composition that comprised paraffin (40% by weight; solid paraffin), inhibitor (2% by weight; diethanolalkylamines), biocide solvent (1% by weight; 5-Chlor-2-methyl-2H-isothiazol-3-on) and water (at 100% by weight).

Example 2—Comparative Example

The composition prepared in example 1 was tested on a bicycle chain and compared to the same composition without graphene. In this experiment, a bicycle chain was treated with the composition to be tested and the bicycle with the chain was positioned on a stand and pedals were moved during 6 blocks of each 1000 km Blocks had differently defined standard conditions, including no contamination (blocks 1, 3 and 5), dry contamination (block 2), wet contamination (block 4) and extreme contamination (block 6; 2× more water and 2× more dirt—including soil and sand—than in wet contamination).

After each block, bicycle chain lengthening was measured with the precision caliper. Chain lengthening was expressed in percentages wherein 100% represents the lengthening of the chain such that the standard chain checker tool sinks into the chain links on both sides: this is a standard procedure for determining that chain replacement should be considered.

During block 4, the composition with wax and graphene only had 33.7% chain lengthening while the comparative composition with wax but without graphene performed worse with 41.7% chain lengthening.

The composition of the invention had total chain lengthening of 86% after block 5. The chain treated with the comparative composition (without graphene) had passed 100% chain lengthening during block 5 (in fact 107%).

It is concluded that the aqueous composition comprising a combination of wax and graphene according to the invention outperformed the same composition without the graphene, supporting the surprising and inventive character of the present invention.

Example 3—Comparison with Commercially Available Lubricants

The composition of the invention prepared in Example 1 was tested in the same set-up as Example 2 but was this time compared to commercially available lubricant products. The chain treated with oil-based Rock N Roll Gold passed 100% lengthening during block 4 (122% stretch). The chain treated with aqueous wax-based composition Squirt® also passed the 100% mark in block 4. The chain treated with oil-based White Lightening Epic Ride® failed in block 3. Wax-based Smoove® failed in block 5. Oil-based Muc Off Hydro Dynamic® and Muc Off Nano® both already failed in block 2. Oil-based Cycle Star Gold® failed in block 3. Oil-based Silca NFS® failed in block 5, while wax-based Wend Wax-2® failed in block 3. The composition of the invention was still usable in block 6.

In conclusion, the composition of the invention outperformed all commercially available lubricants that were tested under the same conditions. In fact, the composition of the invention even beat each of those lubricants during each block. This further supporting the inventive character of the present invention compared to commercially available products used for lubricating bicycle chains.

Example 4—Comparison with Molten Wax Chain Treatment

The composition of the invention with wax and graphene prepared in Example 1 was also compared to a bicycle chain that was treated with molten wax that was reapplied 3 times during every block, thus every 333 kilometers Importantly, this requires a cumbersome process for each block requiring: taking the bicycle chain of the bicycle, cleaning the chain, treating the chain with molten paraffin, brushing off excess wax and placing the chain again on the bike (see also above explanation in the description).

The composition of the invention outperformed the molten wax in blocks 2 and most importantly in block 6, the block with high levels of dirt and water, even though the molten wax chain was cleaned and treated every 333 kilometers. Particularly, this block 6 is representative for mountain biking or for instance off-road motorcycling races. Accordingly, the composition of the invention is surprisingly most suitable for protection of bicycle or motorcycle chains against high dirt levels such as conditions typical for mountain biking or off-road motorbiking.

The invention claimed is:

1. A composition for use in protecting bicycle or motorbike chains from dirt comprising from 30 to 90% by weight of water; from 5 to 65% by weight of wax selected from microcrystalline wax, paraffin and mixtures thereof; and from 0.005 to 10% by weight of graphene.

2. The composition according to claim 1, wherein the composition comprises from 50 to 80% by weight of water and from 10 to 50% by weight of wax.

3. The composition according to claim 1 wherein the composition comprises from 0.1 to 10% by weight of one or more inhibitors.

4. The composition according to claim 1 wherein the wax is paraffin and wherein the aqueous composition is an emulsion.

5. A method of protecting a bicycle or motorbike chain from dirt by dripping a composition comprising from 30 to 90% by weight of water; from 5 to 65% by weight of wax selected from microcrystalline wax, paraffin and mixtures thereof; and from 0.005 to 10% by weight of graphene on the chain.

6. The method according to claim 5, wherein the composition comprises from 50 to 80% by weight of water and from 10 to 50% by weight of wax.

7. The method according to claim 5, wherein the composition comprises from 0.1 to 10% by weight of one or more inhibitors.

8. The method according to claim 5, wherein the wax is paraffin and the aqueous composition is an emulsion.

9. A method of riding using a mountain bike or motorbike with a chain by first treating the chain with a dirt protecting composition comprising from 30 to 90% by weight of water; from 5 to 65% by weight of wax selected from microcrystalline wax, paraffin and mixtures thereof; and from 0.005 to 10% by weight of graphene and subsequently riding in an off-road environment.

10. The method according to claim 9, wherein the composition comprises from 50 to 80% by weight of water and from 10 to 50% by weight of wax.

11. The method according to claim 9, wherein the composition comprises from 0.1 to 10% by weight of one or more inhibitors.

12. The method according to claim 9, wherein the wax is paraffin and the aqueous composition is an emulsion.

13. A method of preparing a composition comprising from 30 to 90% by weight of water; from 5 to 65% by weight of wax selected from microcrystalline wax, paraffin and mixtures thereof; and from 0.005 to 10% by weight of graphene, by preparing an aqueous composition with water and wax and subsequently stiffing in the graphene.

14. The method according to claim 13, wherein the composition comprises from 50 to 80% by weight of water and from 10 to 50% by weight of wax.

15. The method according to claim 13, wherein the composition comprises from 0.1 to 10% by weight of one or more inhibitors.

16. The method according to claim 13, wherein the wax is paraffin and the aqueous composition is an emulsion.

17. Bicycle or motorbike chain covered by a composition comprising from 30 to 90% by weight of water; from 5 to 65% by weight of wax selected from microcrystalline wax, paraffin and mixtures thereof; and from 0.005 to 10% by weight of graphene.

18. The chain according to claim 17, wherein the composition comprises from 50 to 80% by weight of water and from 10 to 50% by weight of wax.

19. The chain according to claim 17, wherein the composition comprises from 0.1 to 10% by weight of one or more inhibitors.

20. The chain according to claim 17, wherein the wax is paraffin and the aqueous composition is an emulsion.

\* \* \* \* \*